(12) United States Patent
Lietgeb

(10) Patent No.: US 6,621,518 B2
(45) Date of Patent: Sep. 16, 2003

(54) VIDEO SURVEILLANCE SYSTEM

(76) Inventor: Denis R. Lietgeb, 317 Woodbridge, Grand Blanc, MI (US) 48430

(*) Notice: Subject to any disclaimer, the term of this patent is extended or adjusted under 35 U.S.C. 154(b) by 246 days.

(21) Appl. No.: 09/843,380

(22) Filed: Apr. 25, 2001

(65) Prior Publication Data

US 2002/0158968 A1 Oct. 31, 2002

(51) Int. Cl.[7] ................................. H04N 9/47
(52) U.S. Cl. ............................ 348/151; 348/151
(58) Field of Search ........................... 348/143, 144, 348/148, 149, 150, 151, 152, 156, 157

(56) References Cited

U.S. PATENT DOCUMENTS

| | | |
|---|---|---|
| 3,819,856 A | 6/1974 | Pearl et al. |
| 4,190,866 A | 2/1980 | Luknar |
| 4,524,384 A | 6/1985 | Lefkowitz et al. |
| 4,881,135 A | 11/1989 | Heilweil |
| 4,982,281 A | 1/1991 | Gutierrez |
| 4,992,867 A | 2/1991 | Weinblatt |
| 5,185,667 A | 2/1993 | Zimmermann |
| 5,384,588 A | 1/1995 | Martin et al. |
| 5,412,708 A | 5/1995 | Katz |
| D365,834 S * | 1/1996 | Dozier .................. D16/203 |
| 5,508,734 A | 4/1996 | Baker et al. |
| 5,594,498 A | 1/1997 | Fraley |
| 5,864,365 A * | 1/1999 | Sramek et al. ............. 348/373 |
| 6,019,524 A * | 2/2000 | Arbuckle .................. 396/427 |
| 6,249,310 B1 * | 6/2001 | Lefkowitz ................. 348/151 |
| 6,392,704 B1 * | 5/2002 | Garcia-Ortiz ............. 348/373 |

* cited by examiner

Primary Examiner—Nhon Diep
(74) Attorney, Agent, or Firm—Gifford, Krass, Groh, Sprinkle, Anderson & Citkowski, P.C.

(57) ABSTRACT

A video surveillance system is disclosed having an elongated tubular housing. The housing includes a planar back wall, a pair of spaced side walls, and a front wall extending between the side walls. The front wall further includes a portion lying in a plane oblique with respect to a plane of the back wall and the back wall, front wall and side walls together form an interior chamber in the housing. An opening is formed in the oblique portion of the front wall, and a video camera having a lens is mounted within the housing chamber so that the camera lens is aligned with the housing opening. The camera produces an output signal representative of the video picture at the camera lens which is electrically connected to video processing equipment, such as a recorder. The housing itself is mounted to a stationary structure, such as a building.

7 Claims, 1 Drawing Sheet

VIDEO SURVEILLANCE SYSTEM

BACKGROUND OF THE INVENTION

I. Field of the Invention

The present invention relates to a video surveillance system.

II. Description of Related

In order to combat crime, many establishments, such as retail establishments, office buildings, and the like utilize video surveillance cameras to monitor the premises. Oftentimes, the output from the video camera is recorded using video recording equipment while, in other cases, security personnel view monitors from the video cameras in an effort to police the premises and reduce crime.

Many of these previously known surveillance cameras, however, are simply placed in open view on the premises. This, however, suffers from two disadvantages.

One disadvantage of openly mounted video surveillance cameras is that criminals, noting the position of the video cameras, are frequently able to evade the video camera by carefully moving around the video camera. For example, for a video camera mounted on the exterior of a building at an elevated height and facing downwardly, seasoned criminals are able to evade the camera by merely walking closely along the side of the building.

A still further disadvantage of these openly mounted video cameras is that the video cameras are subject to attack by criminals in an effort to disable the camera. Since video cameras are relatively delicate electronic instruments, merely striking the video camera with a blunt instrument, such as a metal bar, is sufficient to disable the camera.

SUMMARY OF THE PRESENT INVENTION

The present invention provides a surveillance system which overcomes all of the above-mentioned disadvantages of the previously known devices.

In brief, the surveillance system of the present invention comprises an elongated tubular housing having a planar back wall, a pair of spaced side walls and a front wall extending between the side walls. This front wall includes a portion which extends obliquely with respect to the plane of the back wall. Furthermore, the back wall, side walls and front wall of the housing form an interior housing chamber.

An opening is formed in the oblique portion of the front wall of the housing. A video camera having a lens is then mounted within the interior of the housing so that the camera lens is aligned with the opening in the oblique housing portion. The video camera provides an output signal representative of the view as seen by the camera lens. This camera output signal is coupled to conventional video processing equipment, such as video monitors, a video recorder or the like.

In the preferred embodiment of the invention, a transparent, but tinted, shield is disposed along the oblique wall portion. This transparent shield not only obscures the housing opening, and thus the camera lens, from view but also renders the overall housing decorative in appearance.

The housing back wall is then secured to a stationary structure, such as a building wall, so that the elongated housing has the appearance of a decorative strip on the structure. Since the housing is secured to the structure, the housing remains both stationary and protects the interior camera from attack. Furthermore, since the entire housing has the overall appearance of a decorative strip, even seasoned criminals will be unaware that the housing contains a camera and thus be unable to avoid the video camera.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
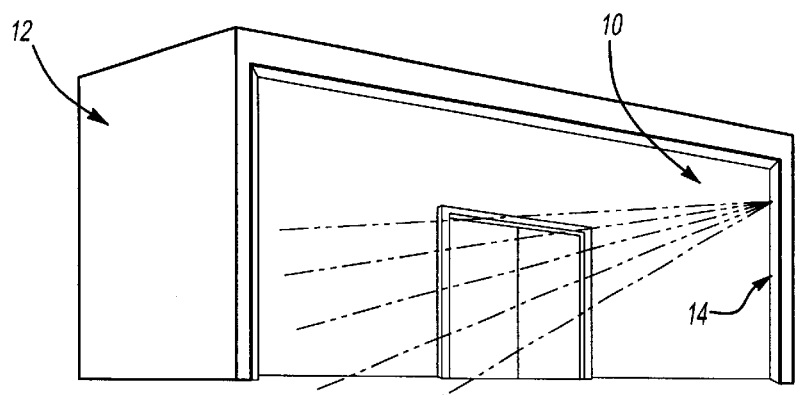
FIG. 1 is a perspective view illustrating a preferred embodiment of the present invention secured to a building.

With reference first to FIG. 1, a preferred embodiment of the surveillance system 10 of the present invention is there shown mounted to a structure 12, such as a building. The surveillance system 10 includes an elongated housing 14 which will be subsequently described in greater detail. Furthermore, although only one housing 14 is shown mounted to the building in FIG. 1, it will be understood that the surveillance system may include multiple housings 14 as desired.

Figure 2:
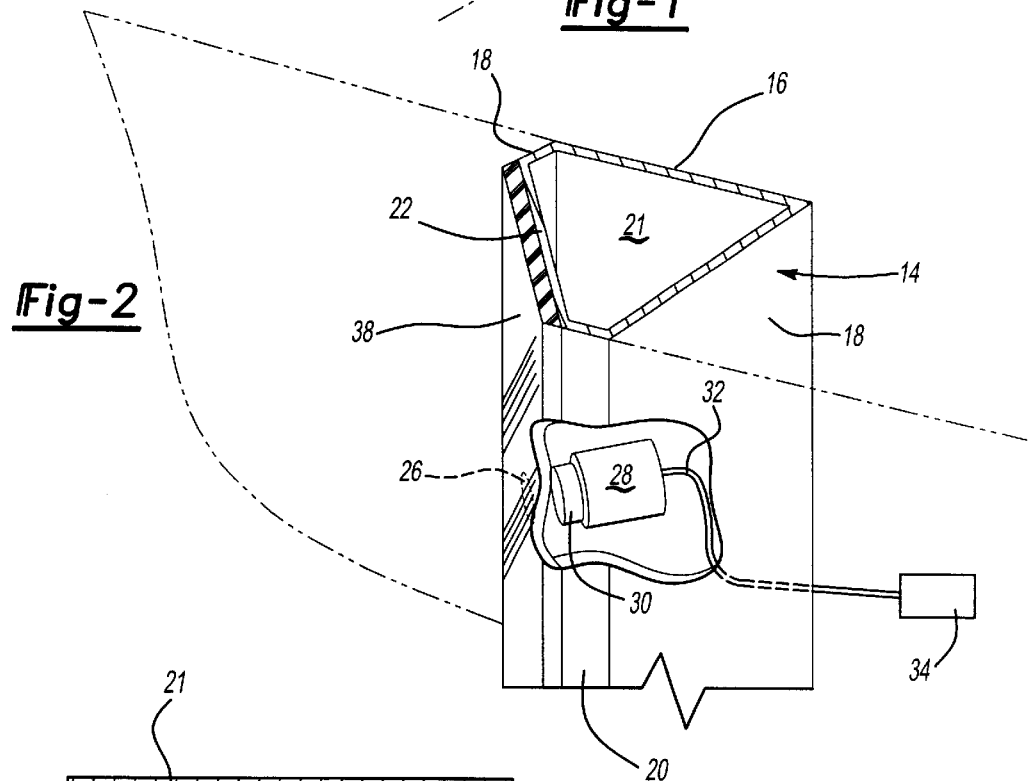
FIG. 2 is a sectional view taken substantially along line 2—2 in FIG. 1 and enlarged for clarity.
Figure 3:
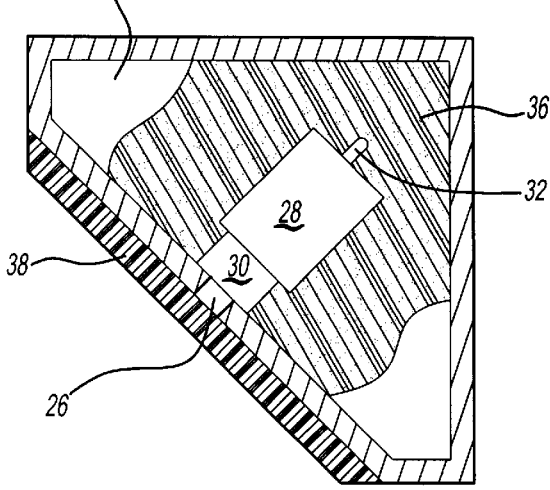
FIG. 3 is a fragmentary front view illustrating a portion of the preferred embodiment of the present invention.

With reference now to FIGS. 2 and 3, the housing 14 is elongated and tubular in shape having a planar back wall 16, a pair of spaced side walls 18 and a front wall 20 extending between the side walls 18. Furthermore, this front wall 20 includes a planar portion 22 which lies in a plane oblique with respect to the plane of the back wall 16. The housing back wall 16, side walls 18 and front wall 20 together form an interior housing chamber 21 which extends along the length of the housing 14.

Still referring to FIGS. 2 and 3, an opening 26 is formed in the oblique portion 22 of the housing front wall 20. A video camera 28 having a lens 30 is then mounted by any conventional means within the housing chamber 22 so that the lens 30 is aligned with the housing opening 26. The video camera 28 thus provides an output signal on an output line 32 representative of the image viewed by the camera lens 30. This output line 32 is then electrically connected to video processing equipment 34 (FIG. 3), such as a video monitor or video recording equipment.

As best shown in FIG. 3, the housing chamber 22 around the camera 28 is preferably filled with a foam 36. This foam protects the video camera 28 from moisture and other condensation and is particularly desirable where the housing 14 is mounted to an exterior wall of a structure 12 (FIG. 1).

As best shown in FIGS. 2 and 3, an elongated transparent strip 38, such as a plastic strip, is secured along the oblique portion 22 of the housing front wall 20. This strip 38 is secured to the housing front wall portion 22 by any conventional means, such as an adhesive, and preferably extends along the entire length of the housing 14. The strip 38, furthermore, is preferably tinted so that the strip 38 obscures the opening 26 in the housing wall portion 22 and thus obscures the camera lens 30 from sight.

Referring again to FIG. 1, the housing 14 is secured to the structure 12 by any conventional fashion, such as by bolting the housing back wall 16 onto the structure 12, so that the housing 14 extends along the length of the structure 12. In doing so, the housing 14 together with the strip 38 provides an appearance of a decorative molding strip on the housing 12. As such, even seasoned criminals will be unaware that the housing 14 contains a hidden surveillance video camera 28.

The present invention thus provides several advantages over the previously known exposed surveillance cameras. First, since the video camera 28 is contained within the housing chamber 22 and the housing 14, in turn, is securely mounted to the structure 12, the housing 14 protects the video camera 28 from attack even if a criminal suspects that the housing 14 contains a hidden camera.

Perhaps more importantly, however, is that, since the video camera 28 is mounted to the oblique portion 22 of the housing front wall 20, the video camera 28 provides a view down along the side of the structure 12. As such, it will not be possible for criminals to avoid capture by the surveillance camera 28 by merely walking closely along the side of the structure 12.

From the foregoing, it can be seen that the present invention provides a simple and yet effective surveillance system that not only hides and protects the video camera, but also provides an enhanced view along the side of the building structure 12. It will also be understood, of course, that multiple housings 14, together with their hidden cameras 28, can be employed to provide a full vision along all of the sides of the building 12.

Having described my invention, however, many modifications thereto will become apparent to those skilled in the art to which it pertains without deviation from the spirit of the invention as defined by the scope of the appended claims.

I claim:

1. A video surveillance system comprising:

an elongated tubular housing, said housing having an elongated planar back wall, a pair of spaced elongated side walls, and an elongated front wall extending between said side walls, said front wall having a portion lying in a plane oblique with respect to a plane of the back wall, said back, front and side walls forming an interior chamber in said housing, said housing having an opening in said portion of said front wall, a video camera having a lens, said video camera being mounted in said housing chamber so that said camera lens is aligned with said housing opening, said camera producing an output signal representative of the video picture at said camera lens, a transparent shield secured to said portion of said housing front wall along the length of said housing, wherein said shield is tinted to thereby visually obscure the camera lens from a position exterior to said housing, wherein said housing is adapted to be mounted to a stationary building, wherein said housing is dimensioned so that said housing extends along the length of the building and simulates a decorative molding strip.

2. The invention as defined in claim 1 wherein said shield comprises a plastic sheet, said sheet being adhesively attached to said portion of said housing front wall.

3. The invention as defined in claim 1 wherein said housing comprises an extrusion.

4. The invention as defined in claim 1 wherein said housing comprises a metal extrusion.

5. The invention as defined in claim 1 wherein said housing comprises an aluminum extrusion.

6. The invention as defined in claim 1 and comprising means to record said output signal from said camera.

7. The invention as defined in claim 1 and comprising foam disposed in said housing chamber around said camera.

* * * * *